(12) United States Patent
Nakauchi

(10) Patent No.: US 7,081,962 B2
(45) Date of Patent: Jul. 25, 2006

(54) ABERRATION MEASURING APPARATUS FOR AN OPTICAL SYSTEM UTILIZING SOFT X-RAYS

(75) Inventor: Akihiro Nakauchi, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 311 days.

(21) Appl. No.: 10/792,508

(22) Filed: Mar. 2, 2004

(65) Prior Publication Data

US 2004/0174532 A1    Sep. 9, 2004

(30) Foreign Application Priority Data

Mar. 5, 2003    (JP)    ............................. 2003-059151

(51) Int. Cl.
    *G01B 9/02*    (2006.01)
(52) U.S. Cl. ...................... 356/521; 356/515
(58) Field of Classification Search ................ 356/521, 356/515, 511, 124; 378/36
    See application file for complete search history.

(56) References Cited

U.S. PATENT DOCUMENTS

| 5,739,898 | A | * | 4/1998 | Ozawa et al. ................ 355/53 |
| 5,898,501 | A | * | 4/1999 | Suzuki et al. ................ 356/511 |
| 6,312,373 | B1 | | 11/2001 | Ichihara ...................... 356/515 |
| 6,456,382 | B1 | | 9/2002 | Ichihara et al. .............. 356/513 |
| 2002/0024643 | A1 | | 2/2002 | Nakauchi et al. |
| 2002/0122162 | A1 | | 9/2002 | Nakauchi et al. |
| 2002/0145717 | A1 | | 10/2002 | Baselmans, et al. ............ 355/55 |
| 2002/0159040 | A1 | | 10/2002 | Hamatani et al. .............. 355/52 |
| 2003/0086078 | A1 | | 5/2003 | Nakauchi |
| 2004/0042094 | A1 | * | 3/2004 | Matsuyama .................. 359/822 |
| 2004/0174533 | A1 | | 9/2004 | Nakauchi |

FOREIGN PATENT DOCUMENTS

| JP | 2000-97666 | 4/2000 |
| JP | 2002-202449 | 7/2002 |
| JP | 2002-258131 | 9/2002 |
| JP | 2002-319539 | 10/2002 |
| JP | 02/054459 A 1 | 11/2002 |
| JP | 2002-334831 | 11/2002 |
| JP | 2003-324752 | 11/2002 |
| JP | 2003-045794 | 2/2003 |

* cited by examiner

Primary Examiner—Gregory J. Toatley, Jr.
Assistant Examiner—Marissa J. Detschel
(74) Attorney, Agent, or Firm—Morgan & Finnegan, LLP

(57) ABSTRACT

This specification discloses a measuring apparatus for measuring the wavefront aberration of an optical system for a soft X-ray which can highly accurately measure the wavefront aberration of the optical system without using the soft X-ray. This measuring apparatus has a light source for supplying light of a predetermined wavelength, and a detector disposed at a location whereat an interference fringe is formed by the light of the predetermined wavelength passed through the optical system, and measures the wavefront aberration of the optical system on the basis of the result of the detection by this detector. The predetermined wavelength is a wavelength within a wavelength range of 150 nm to 300 nm.

4 Claims, 13 Drawing Sheets

| | | NUMBER OF MIRRORS | | | | |
|---|---|---|---|---|---|---|
| | | 4 | 5 | 6 | 7 | 8 |
| REFLECTANCE | 50% | 6% | 3% | 2% | 1% | 0% |
| | 60% | 13% | 8% | 5% | 3% | 2% |
| | 70% | 24% | 17% | 12% | 8% | 6% |

ABERRATION MEASURING APPARATUS FOR AN OPTICAL SYSTEM UTILIZING SOFT X-RAYS

BACKGROUND OF THE INVENTION

1. Field of the Invention

This invention generally relates to an aberration measuring apparatus and method, and particularly to an aberration measuring apparatus for measuring the wavefront aberration of an optical system used for a soft X-ray.

2. Description of the Related Art

When manufacturing a minute semiconductor element such as a semiconductor memory or a logic circuit by the use of photolithography technique, use has heretofore been made of a reduction projection optical system for projecting a circuit pattern depicted on a reticle or a mask (herein these terms are exchangeably used) onto a wafer or the like having a photosensitive agent applied thereto by a projection optical system to thereby transfer the circuit pattern.

A maximum dimension (resolution) which can be transferred by a reduction projection exposing apparatus is proportional to the wavelength of light used for exposure, and is inversely proportional to the numerical aperture (NA) of the projection optical system. Accordingly, the shorter is made the wavelength, the higher becomes the resolution. Therefore, the shortening of the wavelength of exposure light has been progressed with the demand for the minuteness of semiconductor elements in recent years, and as light sources, use is made of a super-high pressure mercury lamp (i-line (a wavelength of about 365 nm)), a KrF excimer laser (a wavelength of about 248 nm), an ArF excimer laser (a wavelength of about 193 nm) and a light source which can supply ultraviolet light of a shorter wavelength.

Semiconductor elements, however, have rapidly become minute, and lithography using ultraviolet light has limitations. So, in order to transfer a very minute circuit pattern of 0.1 μm or less, there has been developed a reduction projection optical system using a soft X-ray (extreme-ultraviolet light: EUV light) having a wavelength of the order of 5 nm to 15 nm which is still shorter in wavelength than the ultraviolet light.

In the wavelength area of the EUV light, the absorption of light by a substance becomes very great and therefore, such a refraction type optical system utilizing the refraction of light as is used in visible light or ultraviolet light is not practical, and in an exposing apparatus using the EUV light, use is made of a reflection type optical system utilizing the reflection of light.

As a reflection type optical element constituting the exposing apparatus using the EUV light, use is made of a multi-layer film mirror comprising two kinds of substances differing in optical constant from each other alternately laminated. For example, several tens of molybdenum (Mo) layers and silicon (Si) layers are alternately laminated on the surface of a glass substrate polished into a precise shape.

To evaluate the wavefront aberration of an optical system constituted by such a multi-layer film mirror, it is desirable to use a light having a wavelength in the vicinity of 13 nm which is an exposure wavelength, and as a light source having high brightness which can constitute an interferometer in such a wavelength range, there is a combination of synchrotron orbital radiation (SOR) and an undulator (see, for example, the following patent publications). These methods are shown, for example, in:

Japanese Patent Application Laid-Open No. 2000-097666 (Corresponding U.S. Pat. No. 6,312,373B and U.S. Pat. No. 6,456,382B);
Japanese Patent Application Laid-Open No. 2002-202449;
Japanese Patent Application Laid-Open No. 2002-258131 (Corresponding WO A1 2002054459);
Japanese Patent Application Laid-Open No. 2002-319539 (Corresponding U.S. AA 2002159040);
Japanese Patent No. 2002-324752 (Corresponding U.S. AA 2002159040);
Japanese Patent No. 2002-334831 (Corresponding U.S. AA 2002145717); and
Japanese Patent No. 2003-045794.

However, the light source comprising a combination of SOR and an undulator is very expensive and large-scale and therefore, the measurement of wavefront aberration using such a light source is disadvantageous and is not realistic in terms of apparatus making and cost.

Accordingly, it is difficult to effect the evaluation of an optical system constituted by the multi-layer film mirror by the use of a light having a wavelength in the vicinity of 13 nm which is the exposure wavelength.

SUMMARY OF THE INVENTION

So, it is an object of the present invention to provide an aberration measuring apparatus and method which can highly accurately measure the wavefront aberration of an optical system without using a real wavelength.

In order to achieve the above object, the aberration measuring apparatus as an aspect of the present invention is an apparatus for measuring the wavefront aberration of an optical system used for a soft X-ray, and has a light source for supplying a light of a predetermined wavelength within a wavelength of 150 nm to 300 nm, and a detector disposed at a location whereat an interference fringe is formed by the light of the predetermined wavelength passed through the optical system, and measures the wavefront aberration of the optical system on the basis of the result of the detection by the detector.

Other objects and further features of the present invention will become apparent from the description of some preferred embodiments of the present invention hereinafter made with reference to the accompanying drawings.

DESCRIPTION OF THE PREFERRED EMBODIMENTS

The inventor, when providing an aberration measuring apparatus and method which can highly accurately measure the wavefront aberration of a reflection type optical system without using an exposure wavelength (for example, a wavelength in the vicinity of 13 nm), has energetically investigated the wavefront aberration of the reflection type optical system from its basis and as a result, has found that the reflection type optical system is characterized in that the influence of chromatic aberration is small and therefore, it is possible to constitute an interferometer by other wavelength than the exposure wavelength as an alternative and measure the wavefront aberration of the reflection type optical system.

Figure 1:
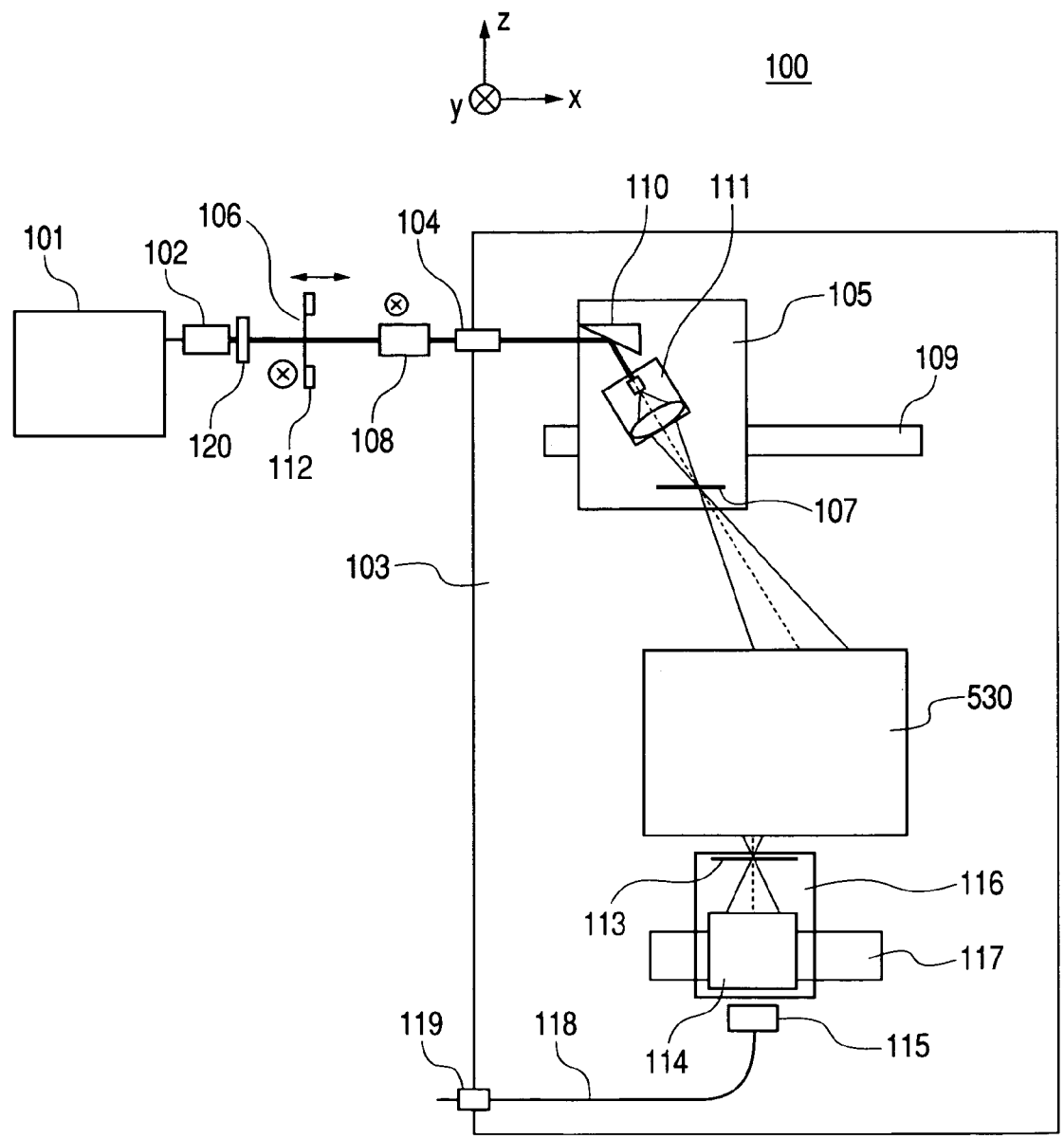
FIG. 1 schematically shows the construction of an illustrative form of an aberration measuring apparatus as an aspect of the present invention.

An aberration measuring apparatus which is an illustrative mode of the present invention will hereinafter be described with reference to the accompanying drawings. Throughout the drawings, like members are given like reference numerals and duplicate description will be omitted. FIG. 1 schematically shows the construction of an illustrative form of the aberration measuring apparatus 100 as an aspect of the present invention.

Referring to FIG. 1, the aberration measuring apparatus 100 has a light source 101, an expander 102, a chamber 103, a window 104 for directing light into the chamber 103, a point diffraction interferometer (PDI) unit 105, a diffraction grating 106, an object side mask 107, ray moving means 108, a PDI unit driving stage 109, a bending mirror 110, ray condensing means 111, diffraction grating driving means 112, an image side mask 113, image pickup means (a light amount detector, a light intensity detector) 114, a connector 115, a wafer side unit 116, a driving stage 117, a cable 118, a cable piercing portion 119 and a polarizing plate 120, and measures the wavefront aberration of a projection optical system 530.

Light emitted from the light source 101 has its diameter expanded by an expander 102, and becomes polarized light parallel to the y-axis by the polarizing plate 120 and enters the diffraction grating 106.

The light supplied by the light source 101 is the fourth higher harmonic of light oscillated from glass such as YAG or YVO4 having had its Nd doped, and the wavelength of such light is 266 nm.

The reason why the light of the wavelength 266 nm is used will be described here. It is desirable that the light supplied by the light source 101 be stable in wavelength and sufficient great in the reflectance of a multi-layer film mirror, not shown, constituting the projection optical system 530.

Figures 5, 6:
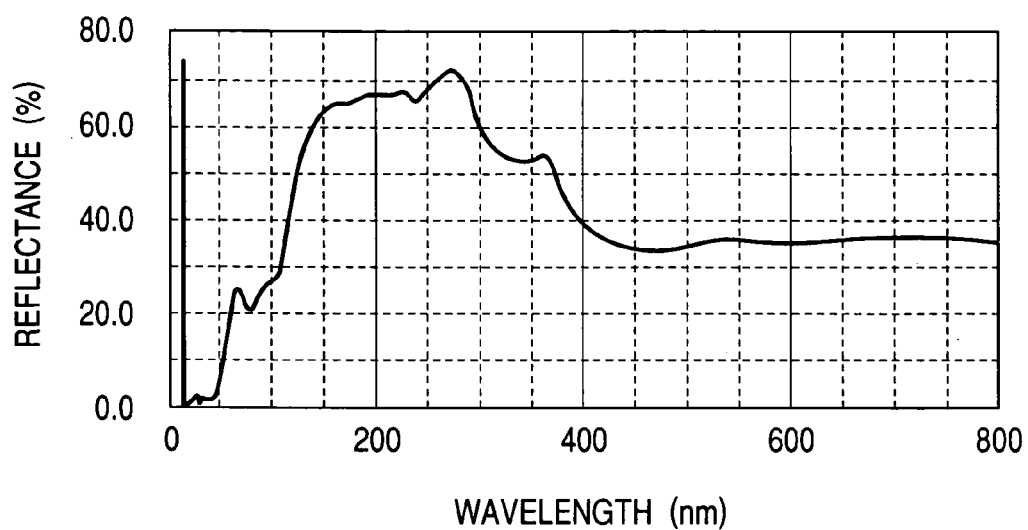
FIG. 5 is a graph showing the reflectance characteristic of multi-layer film comprising 40 pairs of laminated Mo/Si layers each of which is high reflection film in the wavelength area of EUV light to perpendicular incident light.
FIG. 6 is a table showing the relation between the number of mirrors constituting an optical system and the reflectance of the entire optical system.

FIG. 5 is a graph showing the reflectance characteristic of multi-layer film comprising 40 pairs of laminated Mo/Si layers each of which is high reflection film of a wavelength area of EUV light for perpendicular incident light. In FIG. 5, wavelength (nm) is adopted as the axis of abscissas, and reflectance (%) is adopted as the axis of ordinates.

Referring to FIG. 5, it will be seen that there is a sharp, great peak near a wavelength of 13 nm which is the wavelength area of the EUV light, and as the wavelength becomes longer, the reflectance once decreases, but this multi-layer film has a reflectance of 60% or greater for the vicinity of a wavelength 150 nm to the vicinity of a wavelength 300 nm. Particularly, the reflectance between a wavelength 260 nm to 280 nm is a value of 70% or greater. Thereafter, the reflectance decreases substantially gently with the wavelength, and is between 30% to 40% in the wavelength area of visible light of a wavelength of 400 nm or greater. As described above, the Mo/Si multi-layer film is varied in reflectance by wavelength, and the range between the wavelength 150 nm to 300 nm is a high reflectance area.

The projection optical system 530 is constituted by multi-layer film mirrors, not shown, the number of which is four to eight. FIG. 6 is a table showing the relation between the number of the mirrors constituting the optical system and the reflectance of the entire optical system. Referring to FIG. 6, when the reflectance of the mirrors is 50%, the reflectance of the whole of the optical system constituted by four mirrors (hereinafter referred to as the 4-mirror system) is 6%, and the reflectance of the whole of the optical system constituted by eight mirrors (hereinafter referred to as the 8-mirror system) is substantially 0%.

On the other hand, when the reflectance of the mirrors is 60%, the reflectance of the whole of the 4-mirror system is 13%, and the reflectance of the whole of the 8-mirror system is 2%. Further, when the reflectance of the mirrors is 70%, the reflectance of the whole of the 4-mirror system is 24%, and the reflectance of the whole of the 8-mirror system is 6%, and it will be seen that the mirror systems have sufficient reflectances.

Accordingly, if use is made of a light source supplying light within a wavelength area of the wavelength 150 nm to the wavelength 300 nm for which the reflectance of the mirrors is 60% or greater, it will be possible to obtain a sufficiently high reflectance as the entire optical system with respect to aberration measurement. If use is made of a light source supplying light within a wavelength area of a wavelength 260 nm to 280 nm for which the reflectance of the mirrors is 70% or greater, a still higher reflectance will be obtained as the entire optical system.

In such a wavelength area, as a wavelength 266 nm, use can be made of the fourth higher harmonic of light oscillated from glass such as YAG or YVO4 having had its Nd doped. Such a light source is capable of continuously oscillating, sufficient in brightness and excellent in wavelength stability or the like, and is very stable. Therefore, if light of the wavelength 266 nm is used as light for an interferometer, highly accurate measurement of wavefront aberration will become possible because the reflectance of the entire optical system is high and the stability of the light source itself is also high.

Use can also be made of a wavelength 264.3 nm, a wavelength 257.2 nm, a wavelength 250.8 nm, a wavelength 248.2 nm, a wavelength 244.0 nm, a wavelength 238.2 nm and a wavelength 229.0 nm which are the second higher harmonic of an Ar ion laser, and a wavelength 265.5 nm, a wavelength 260.4 nm, a wavelength 234.0 nm, a wavelength 266.5 nm, etc. which are the second higher harmonic of a Kr ion laser.

Turning back to FIG. 1, the reason why the polarization direction of the light emitted from the light source 101 is made parallel to the y-axis is as follows. By the reflecting mirror, not shown, of the projection optical system 530, p-polarized light is greatly attenuated as compared with s-polarized light. Therefore, when the polarization of light entering the projection optical system 530 is defined as the s-polarized light, in other words, light of polarization parallel to the sagittal direction of the object plane of the projection optical system 530 is made to enter, it becomes possible to utilize the light efficiently.

The diffraction grating 106 is a diffraction grating extending in z-direction and periodically arranged in y-direction, and the light diffracted by the diffraction grating 106 generates a plurality of diffracted lights on xy plane in FIG. 1. The plurality of diffracted lights are displaced in y-direction by the ray moving means 108, and thereafter pass through the window 104 and enter the PDI unit 105.

Figure 2:
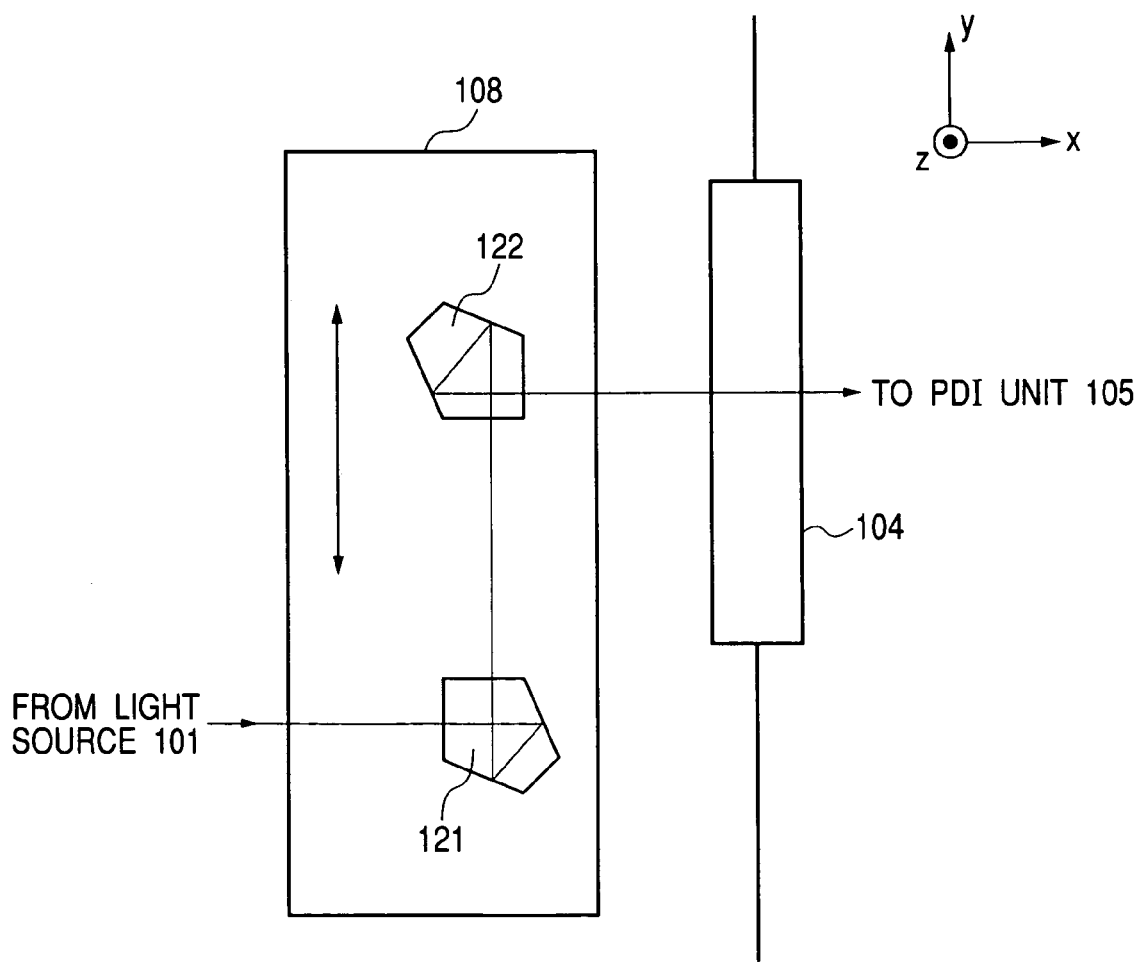
FIG. 2 schematically shows the construction of ray moving means shown in FIG. 1 as it is seen from +z-direction.

FIG. 2 schematically shows the construction of the ray moving means 108 shown in FIG. 1 as it is seen from +z-direction. Referring to FIG. 2, the light from the light source 101 which has entered from −x-direction is deflected to +y-direction by a first pentaprism 121, and is again deflected to +x-direction by a second pentaprism 122. To change the position of the ray in y-direction, it is possible to accomplish it by driving the second pentaprism 122 to thereby change the interval between the first pentaprism 121 and the second pentaprism 122.

The pentaprism generally has the feature that the ray is not deflected with respect to the rotation about the z-axis and therefore, has the feature that even if the second pentaprism 122 is inclined, it is difficult for the ray to fluctuate. In the present embodiment, the pentaprisms are used as the ray moving means 108, but if the inclination tolerance is small, it will also be possible to construct the ray moving means by the use of an ordinary 90° bending mirror.

The window 104 is formed of a glass material such as quartz transmitting light of a wavelength 266 nm therethrough and having sufficient endurance against the pressure difference from the interior of the chamber 103 in a vacuum state. The window 104 is in the form of a plane parallel plate or a wedge plate, and anti-reflection film against the wavelength of the light from the light source 101 is applied to the surface thereof.

The light having passed through the window 104 into the PDI unit 105 is deflected by the bending mirror 110. The light deflected by the bending mirror 110 passes through the ray condensing means 111 and is condensed on the object side mask 107.

Figure 3:
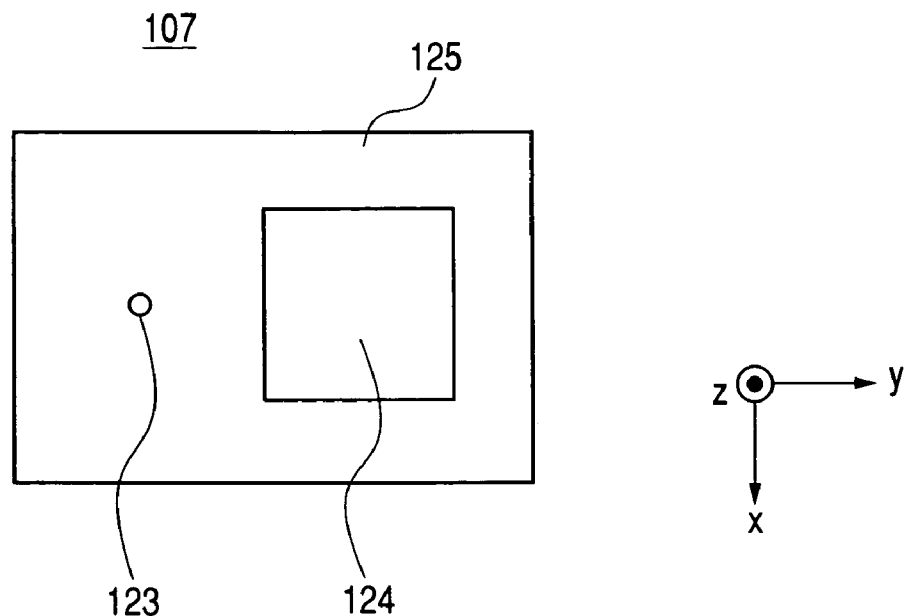
FIG. 3 is a schematic plan view of an object side mask shown in FIG. 1.

FIG. 3 is a schematic plan view of the object side mask 107 shown in FIG. 1. Referring to FIG. 3, the object side 107 has a pinhole 123 and an opening portion 124 disposed in y-direction. The diameter $\phi_0$ of the pinhole 123 is of a size equal to or less than mathematical expression 1 shown below when the object side numerical aperture of the projection optical system 530 is defined as $NA_0$ and the wavelength of the light source 101 is defined $\lambda$.

$$\phi_0 = 0.52 \lambda / NA_0$$

The diameter $\phi_0$ of such a pinhole 123 is such a diameter that of the light having emerged from the pinhole 123, the intensity of light flying at the angle of $NA_0$ is ½ relative to light flying to the center, and within this range, it is possible to regard the wave front after emerging sufficiently as a spherical wave. The opening portion 124 is an opening sufficiently larger than a diffraction limit.

The plurality of diffracted lights diffracted by the diffraction grating 106 enter the PDI unit 105, and among them, the first-order light passes through the pinhole 123 in the object side mask 107, and the 0-order light passes through the opening portion 124 in the object side mask 107. The diffracted light passing through the pinhole 123, though it is the −first-order light, is essentially the same as the first-order light and therefore, will be described here as the first-order light.

The 0-order light having a diameter $\phi_0$ equal to or less than mathematical expression 1 which has passed through the pinhole 123 in the object side mask 107 and has become a spherical wave and the first-order light which has passed through the opening portion 123 enter the projection optical system 530. Diffracted lights of the other orders are intercepted by the light intercepting portion 125 or the like of the object side mask 107.

The lights having emerged from the object side mask 107 pass through the projection optical system 530 constituted by a mirror, not shown, to which multi-layer film reflecting light at the wavelength of a soft X-ray is applied, and are condensed on the image side mask 113 in the wafer side unit 116.

Figure 4:
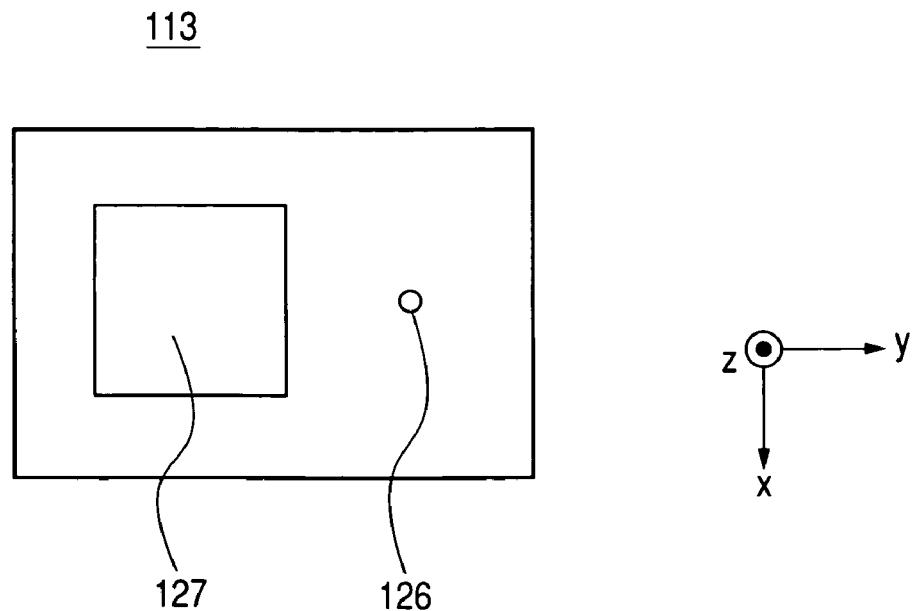
FIG. 4 is a schematic plan view of an image side mask shown in FIG. 1.

FIG. 4 is a schematic plan view of the image side mask 113 shown in FIG. 1. Referring to FIG. 4, the image side mask 113, like the object side mask 107, has a pinhole 126 and an opening portion 127 disposed side by side in y-direction. However, the disposition order of the pinhole 126 and the opening portion 127 of the image side mask 113 is converse to that of the object side mask 107. The 0-order light passes through the pinhole 126 in the image side mask 113, and the first-order light passes through the opening portion 127.

The diameter $\phi_i$ of the pinhole 126 in the image side mask 113 is of a size equal to or less than mathematical expression 2 shown below when the image side numerical aperture of the projection optical system 530 is defined as $NA_i$ and the wavelength of the light source 101 is defined as $\lambda$.

$$\phi_i = 0.52 \lambda / NA_i$$

The diameter $\phi_i$ of such a pinhole 126 is such a diameter that of the light having emerged from the pinhole 126, the intensity of light flying at the angle of $NA_i$ is ½ relative to light flying to the center, and within this range, it is possible to regard the wavefront after emerging sufficiently as a spherical wave. The opening portion 127 is an opening sufficiently larger than the diffraction limit.

The 0-order light and the first-order light which have passed through the image side mask 113 interfere with each other and are observed as an interference fringe on the image pickup means 114. The image pickup means 114 is a solid state image pickup element such as a CCD or a CMOS, and is cooled by a Peltier element or as required, a coolant such as liquid nitrogen.

In such a state, the diffraction grating 106 is scanned in the direction of the y-axis shown in FIG. 1. By the diffraction grating 106 being thus scanned, the phase of the first-order light is changed, but the phase of the 0-order light is not changed and therefore, it is possible to effect phase measurement of high accuracy by the so-called fringe scan method.

The first-order light which has arrived at the image pickup means 114 has already passed through the pinhole 123 in the object side mask 107, the projection optical system 530 and the opening portion 127 of the image side mask 113 and therefore, is a wavefront in which the wavefront aberration of the projection optical system 530 rests on the spherical wave formed in the pinhole 123.

On the other hand, the 0-order light has passed through the opening portion 124 of the object side mask 107, the projection optical system 530 and the pinhole 126 in the image side mask 113 and therefore, it is a wavefront on which the aberration of the PDI unit 105, etc. and the aberration of the projection optical system 530 are put until it enters the object side mask 107, but when it passes through the pinhole 126 in the image side mask 113, it becomes a spherical wave with the preceding space information having disappeared.

That is, in the image pickup means 114, there is observed an interference fringe corresponding to the difference between the spherical wave (i.e., the first-order light) having the wavefront aberration information of the project optical system 530 and the spherical wave (i.e., the 0-order light). Accordingly, the interference fringe observed in the image pickup means 114 is only the wavefront aberration of the projection optical system 530 and highly accurate measurement is possible.

In the case of an amplitude type diffraction grating of a duty ratio 1, the 0-order light has about 2.5 times as great as the amount of light of the first-order light. Accordingly, when the aberration of the projection optical system 530 is 0 and the alignment error of the interferometer and the manufacturing errors of the pinholes 123 and 126 are also 0, the ratio between the 0-order light and the first-order light observed on the image pickup means 114 is 2.5 times. Actually, however, the errors do not become 0. Particularly, the pinhole 126 in the image side mask 113, as compared with the pinhole 123 in the object side mask 107, is smaller in diameter by an amount corresponding to the imaging magnification of the projection optical system 530 and therefore, alignment is difficult.

Further, due to the aberration of the projection optical system 530, distortion and curvature of image field, the light condensed in the pinhole 126 in the image side mask 113 assumes a shape destroyed from an ideal airy pattern and therefore, the amount of light after transmitted through the pinhole 126 decreases greatly. Accordingly, by masking the amount of the light (i.e., the 0-order light) entering the pinhole 126 in the image side mask 113 greater than the amount of the first-order light, stable measurement becomes possible even under such a situation.

It is also possible to prepare a plurality of diffraction gratings of different duty ratios, and use as the diffraction grating 106 a diffraction grating having a duty ratio providing an optimum light amount ratio, to thereby effect measurement of light contrast always excellent in the balance of the amount of light.

While in the present embodiment, the 0-order light and the first-order light are used, ±first-order lights may be used. For example, in an amplitude type diffraction grating of duty 1, the amounts of light of the ±first-order lights after diffracted are equal to each other and therefore, the use of the ±first-order lights is effective when the aberration of the projection optical system 530 is small and the eclipse of rays is small. Further, the diffraction grating 106 used may be any of an amplitude type and a phase type.

When the wavefront aberrations of the projection optical system 530 at different image points thereof are to be measured, the PDI unit 105 is moved by the PDI unit driving stage 109. The PDI unit driving stage 109 may be a stage exclusively for the PDI unit 105, or may be common to a reticle stage for projection exposure. Likewise, the wafer side unit 116 is moved to the position of the image of the object side mask 107 by the projection optical system 530, by the driving stage 117. The driving stage 117 may be a stage exclusively for the wafer side unit 116, or may be common to a wafer stage for projection exposure. Further, when the PDI unit 105 has been moved in the direction of the y-axis shown in FIG. 1, the second pentaprism 122 of the ray moving means 108 is driven and the light is directed to the PDI unit 105.

In such a state, the diffraction grating 106 is driven by the diffraction grating driving means 112 by the use of the above-described method, and phase measurement is effected by the fringe scan method, whereby it is possible to measure the wavefront aberrations of the different image points of the projection optical system 530. In this case, when the distance between the diffraction grating 106 and the ray condensing means 111 varies greatly and the ray is eclipsed, it is also possible to provide a mechanism, not shown, for driving the diffraction grating 106 in the-direction of the x-axis, and make the distance between the diffraction grating 106 and the ray condensing means 111 constant so that the ray may not be eclipsed.

In the present embodiment, the light source 101 is disposed outside the chamber 103 in a vacuum state. That is, by adopting a construction in which the ray is drawn around by the ray moving means 108 or the like and the light is directed into the chamber 103 through the window 104, whereby it becomes possible to dispose the light source 101 which is a heat source outside the vacuum chamber 103. Thereby, an improvement in the heat environment in the chamber 103 and the downsizing of the chamber 103 become possible. Also, it is also possible to easily cope with the measurement of the wavefront aberrations of the projection optical system 530 at the different image points thereof.

Also, the wafer side unit 116 requires stage driving accuracy higher by the magnification of the projection optical system 530, as compared with the PDI unit 105. On the other hand, the wafer side unit 116 requires the cable 118 for the electric power supply to the image pickup means 114 and the delivery of an image signal. Therefore, in an apparatus construction wherein stage movement is effected while dragging the cable 118, it is difficult to obtain sufficient stage driving accuracy.

So, in the present invention, design is made such that the image pickup means 114 and the cable 118 are connected together by a detachably mountable connector 115. Accordingly, as long as the wafer side unit 116 is moved by the driving stage 117, the connector 115 is detached, and after the movement of the wafer side unit 116 is ended, the connector 115 is connected to the wafer side unit 116 by connector moving means, not shown, whereby the driving stage 117 is movable without dragging the cable 118. Thereby, it is possible to realize high stage driving accuracy.

Figure 7:
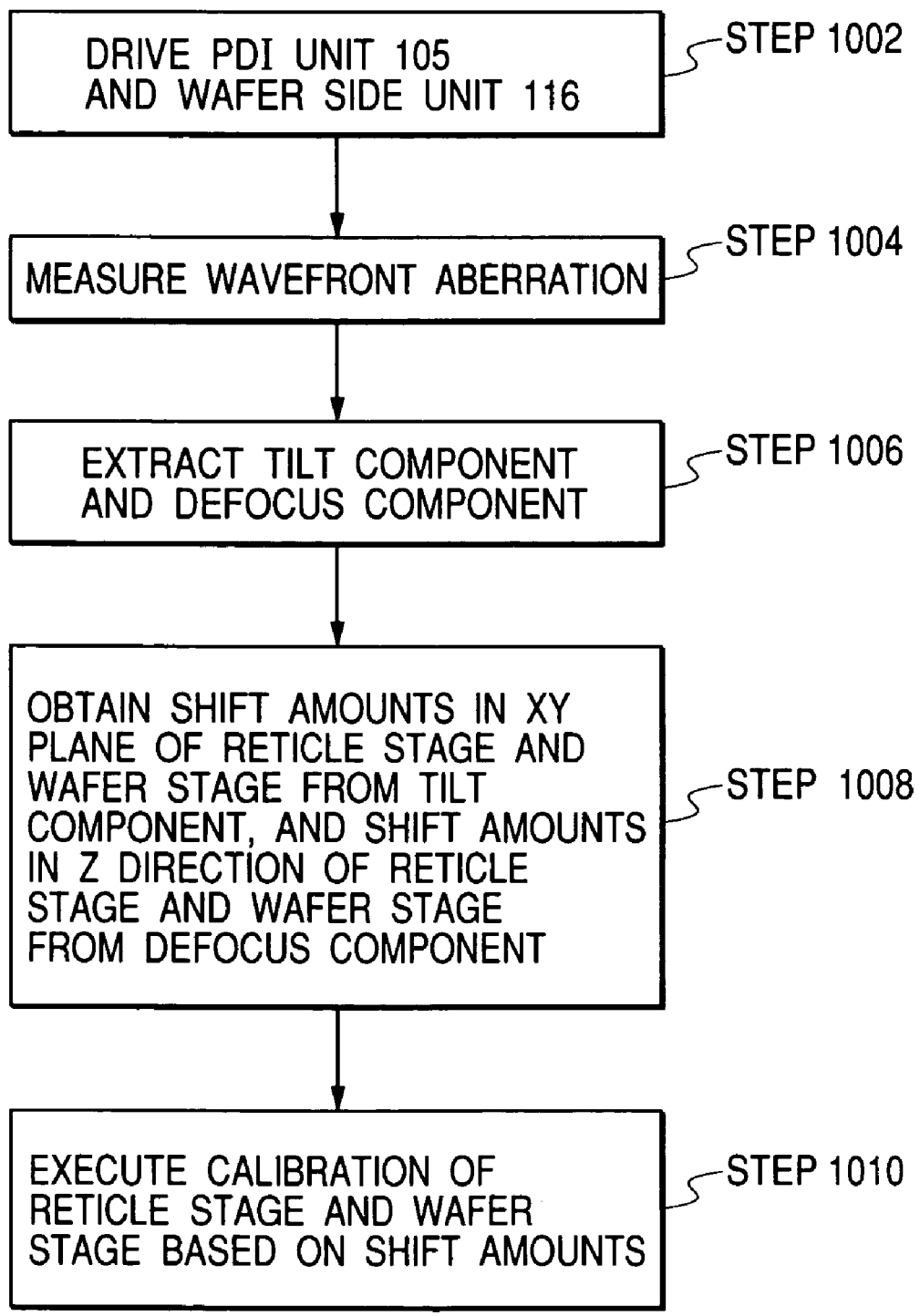
FIG. 7 is a flow chart for illustrating the calibration of a reticle stage and a wafer stage using the aberration measuring apparatus shown in FIG. 1.

While in the foregoing, description has been made of the measurement of the wavefront aberration of the projection optical system 530, the aberration measuring apparatus 100 of the present invention can also effect the calibration of the reticle stage and the wafer stage. FIG. 7 is a flow chart for illustrating the calibration of the reticle stage and the wafer stage using the aberration measuring apparatus 100.

First, the PDI unit 105 and the wafer side unit 116 are moved to an object point and an image point, respectively, to be measured by the PDI unit driving stage 109 and the driving stage 117 (a step 1002). Then, the measurement of the wavefront aberration is effected at a position to which the PDI unit 105 and the wafer side unit 116 have been moved (a step 1004). A tilt component and a focus component are extracted from the measured wavefront aberration (a step 1006). The shift amounts of the reticle stage and the wafer stage in xy plane are obtained from the tilt component extracted at the step 1006, and the shift amounts of the reticle stage and the wafer stage in z-direction are obtained from a defocus component (a step 1008), and the calibration of the reticle stage and the wafer stage is effected on the basis of such shift amounts.

If required, it is also possible to effect the calibration of the reticle stage and the wafer stage on the basis of the result of the detection of a plurality of image points.

In the present embodiment, the calibration is effected on the basis of the wavefront aberration measurement and therefore, it is not necessary to discretely prepare an alignment system, and the downsizing of the apparatus is possible.

Also, while in the present embodiment, design is made such that the light enters from the reticle side, design may be made such that the light enters from the wafer side. In this case, the wafer side is telecentric, and this leads to the alignment of the reticle placed on the wafer side.

Figure 8:
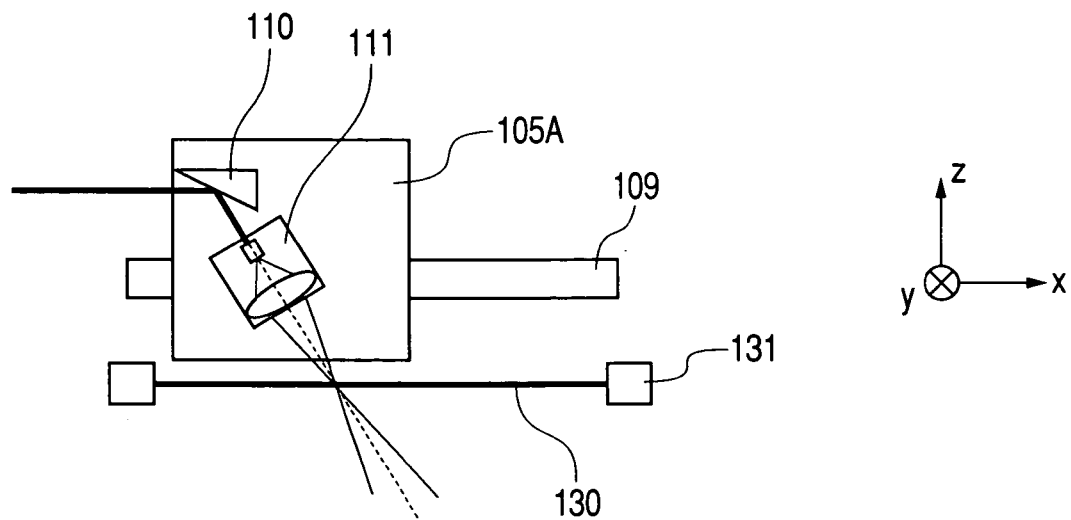
FIG. 8 schematically shows the construction of a PDI unit which is a modification of a PDI unit shown in FIG. 1.
Figure 9:
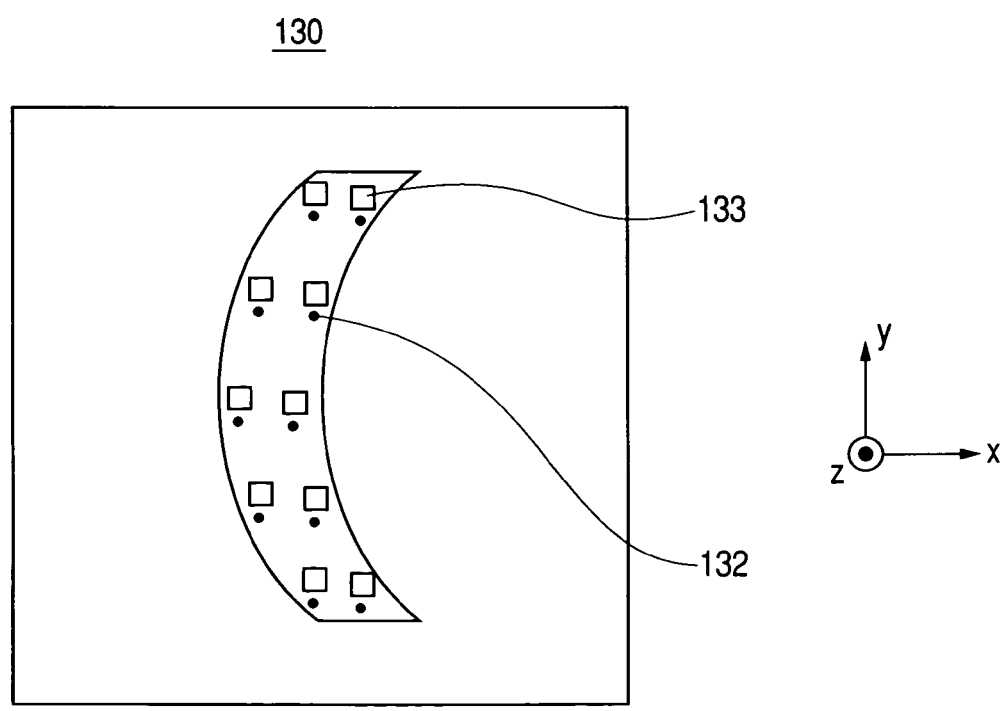
FIG. 9 is a schematic plan view of a mask shown in FIG. 8.

A PDI unit 105A which is a modification of the PDI unit 105 will hereinafter be described with reference to FIGS. 8 and 9. FIG. 8 schematically shows the construction of the PDI unit 105A which is a modification of the PDI unit 105 shown in FIG. 1. FIG. 9 is a schematic plan view of a mask 130 shown in FIG. 8.

While in the PDI unit 105 shown in FIG. 1, design is made such that the image side mask 107 is in the PDI unit 105 and is moved integrally with the ray condensing means 111, in the PDI unit 105A shown in FIG. 8, the mask 130 is used instead of the image side mask 107.

The mask 130 is disposed on a mask stage 131, and assumes a construction as shown in FIG. 9 wherein pairs of pinholes 132 having a size equal to or less than the diameter of mathematical expression 1 are disposed at object points to be measured and pairs of opening portions 133 sufficiently larger than the diffraction limit are disposed at measurement object points.

The PDI unit 105A is driven by the PDI driving stage 109, and is set so as to make the diffracted light, e.g. the first-order light, from the diffraction grating 106 enter the pinholes 132 in the mask 130, and make the 0-order light enter the opening portions 133 of the mask 130, and effects measurement. When a different object point is to be measured, the PDI unit 105A is moved to an object point on the mask 130 which is to be measured. If required, the incident position of the ray is changed by the use of the ray moving means 108 to thereby effect measurement.

Figure 10:
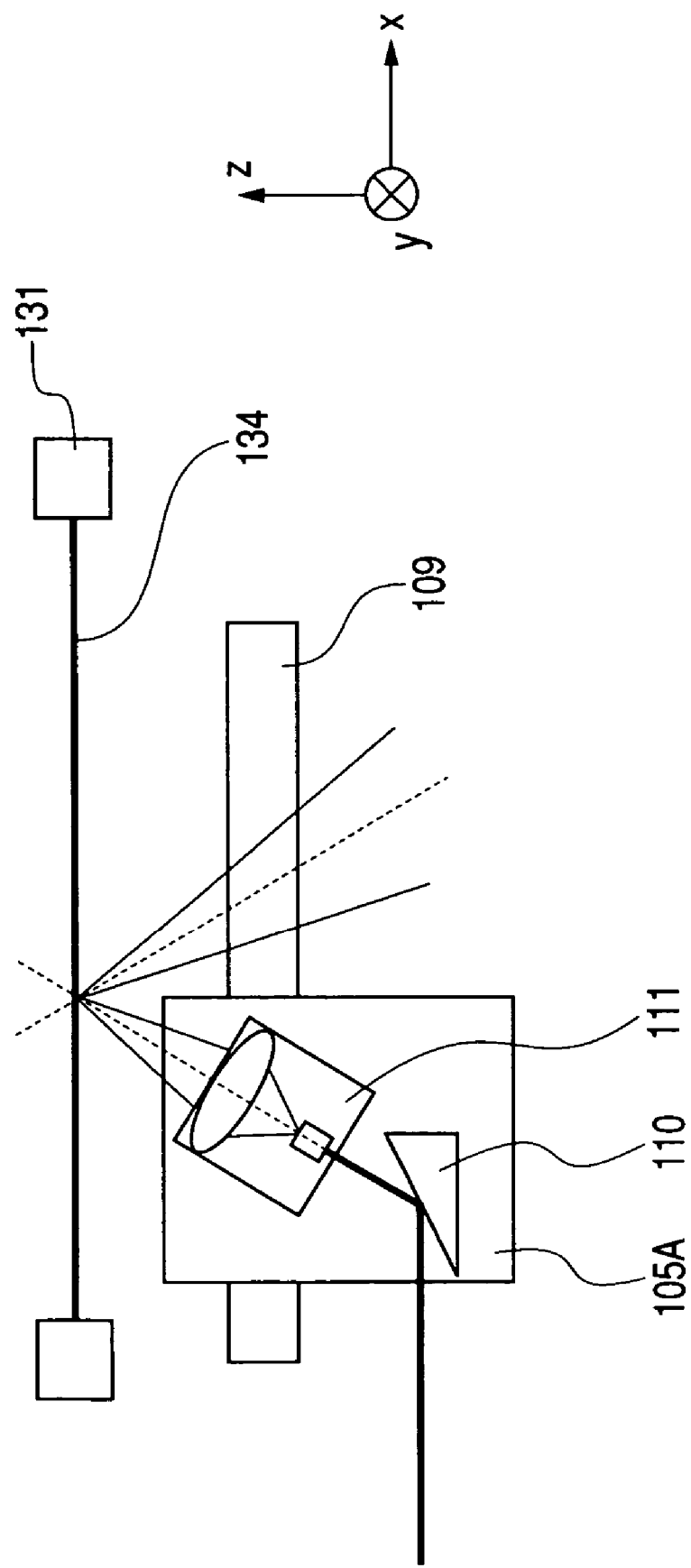
FIG. 10 schematically shows the construction of a PDI unit using a reflection type mask instead of a transmission type mask.

Also, as shown in FIG. 10, a reflection type mask 134 can also be used instead of the transmission type mask 130 to constitute the PDI unit 105A. The reflection type mask 134 has such high reflection film that both of the pair of pinhole 132 and opening portion 133 at each object point of the mask 130 shown in FIG. 9 exhibit a reflectance of substantially 100% for the wavelength of the light source 101. Thereby, the measurement of the wavefront aberration becomes possible in a state approximate to the actual measurement at the exposing step using a reflection type reticle. Here, FIG. 10 schematically shows the construction of the PDI unit 105A using the reflection type mask 134 instead of the transmission type mask 130.

From the viewpoint of the reflection efficiency of light, it is desirable that polarized light parallel to the sagittal direction of the projection optical system 530 enter the projection optical system 530. However, in the aberration measuring apparatus 100 shown in FIG. 1, design is made such that the PDI unit 105 is moved only in the directions of the x- and y-axis and therefore, light having polarization parallel to the sagittal direction at all object points does not always enter.

Figure 13:
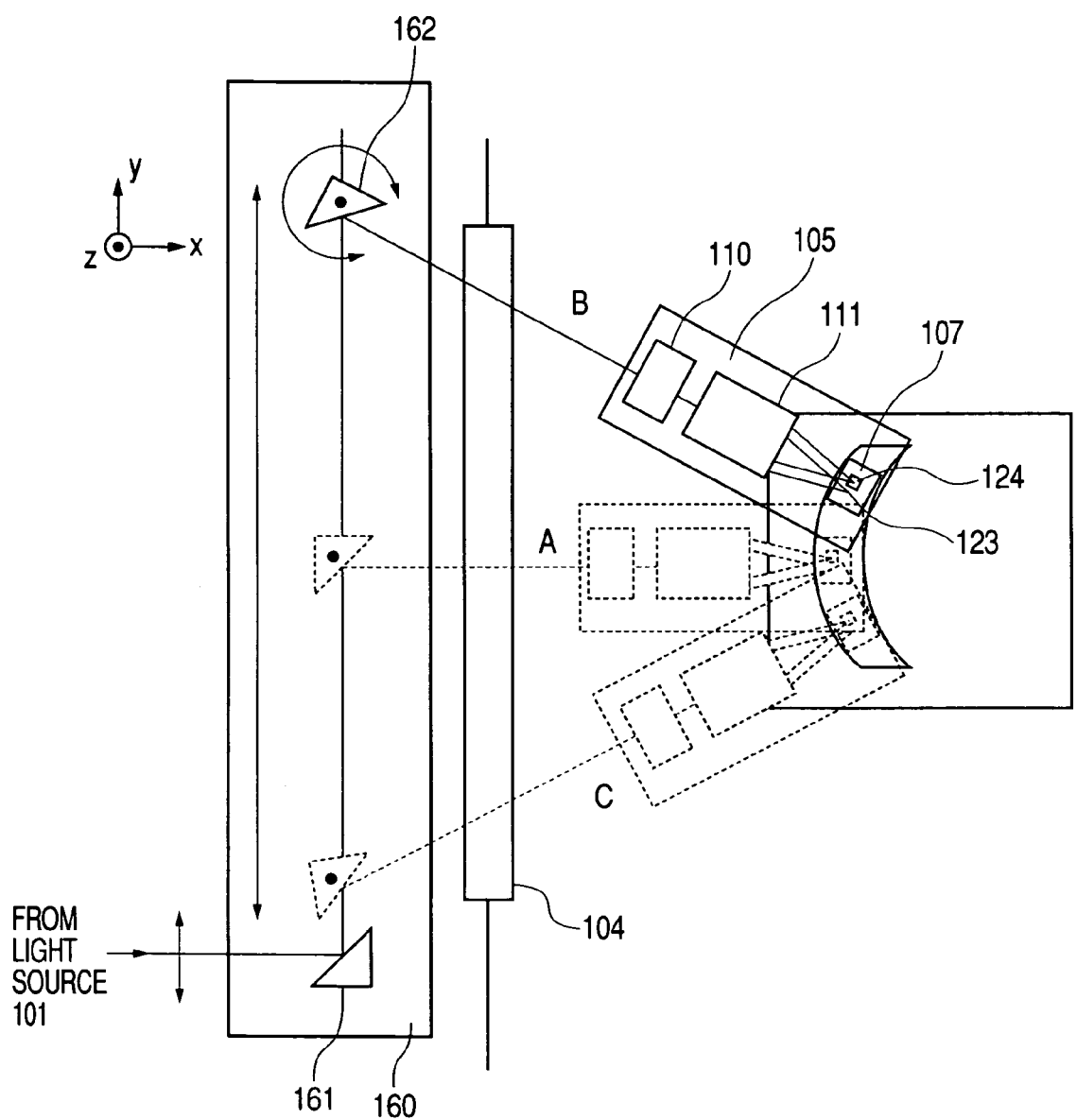
FIG. 13 schematically shows the construction of ray moving means which is a modification of the ray moving means shown in FIG. 1.

So, by using ray moving means 160 shown in FIG. 13 instead of the ray moving means 108 of the aberration measuring apparatus 100, it is possible to always cause polarized light parallel to the sagittal direction to enter the projection optical system 530 even if the object point to be measured changes. FIG. 13 schematically shows the construction of the ray moving means 160 which is a modification of the ray moving means 108 shown in FIG. 1.

Referring to FIG. 13, the ray moving means 160 is comprised of a first mirror 161 and a second mirror 162 movable in the direction of the y-axis and rotatable about the z-axis. The first mirror 161 and the second mirror 162 have applied to the surfaces thereof such dielectric material multi-layer film that light having p-polarization enters substantially 100%.

The PDI unit 105 is xy-moved by a stage, not shown, so that the object side mask 107 may come to an object point to be measured. Also, the PDI unit 105 is rotated about the z-axis so that a straight line linking the pinhole 123 and opening portion 124 of the object side mask 107 together may become parallel to the sagittal direction of the object plane of the projection optical system.

The second mirror 162 of the ray moving means 160 is moved in y-direction and is rotated about the z-axis so that the light may be directed to the PDI unit 105.

In such a state, the light emitted from the light source 101 and having polarization parallel to y-direction by the polarizing plate 120 is transmitted through the ray moving means 160 and the PDI unit 105, and becomes polarized light parallel to the sagittal direction of the object plane when it enters the projection optical system 530.

As described above, in the construction of the aberration measuring apparatus 100, the ray moving means 160 is used instead of the ray moving means 108, and provision is made of a mechanism for xy-moving and rotating the PDI unit 105 about the z-axis, whereby the measurement of the wavefront aberration good in reflection efficiency becomes possible.

Figure 11:
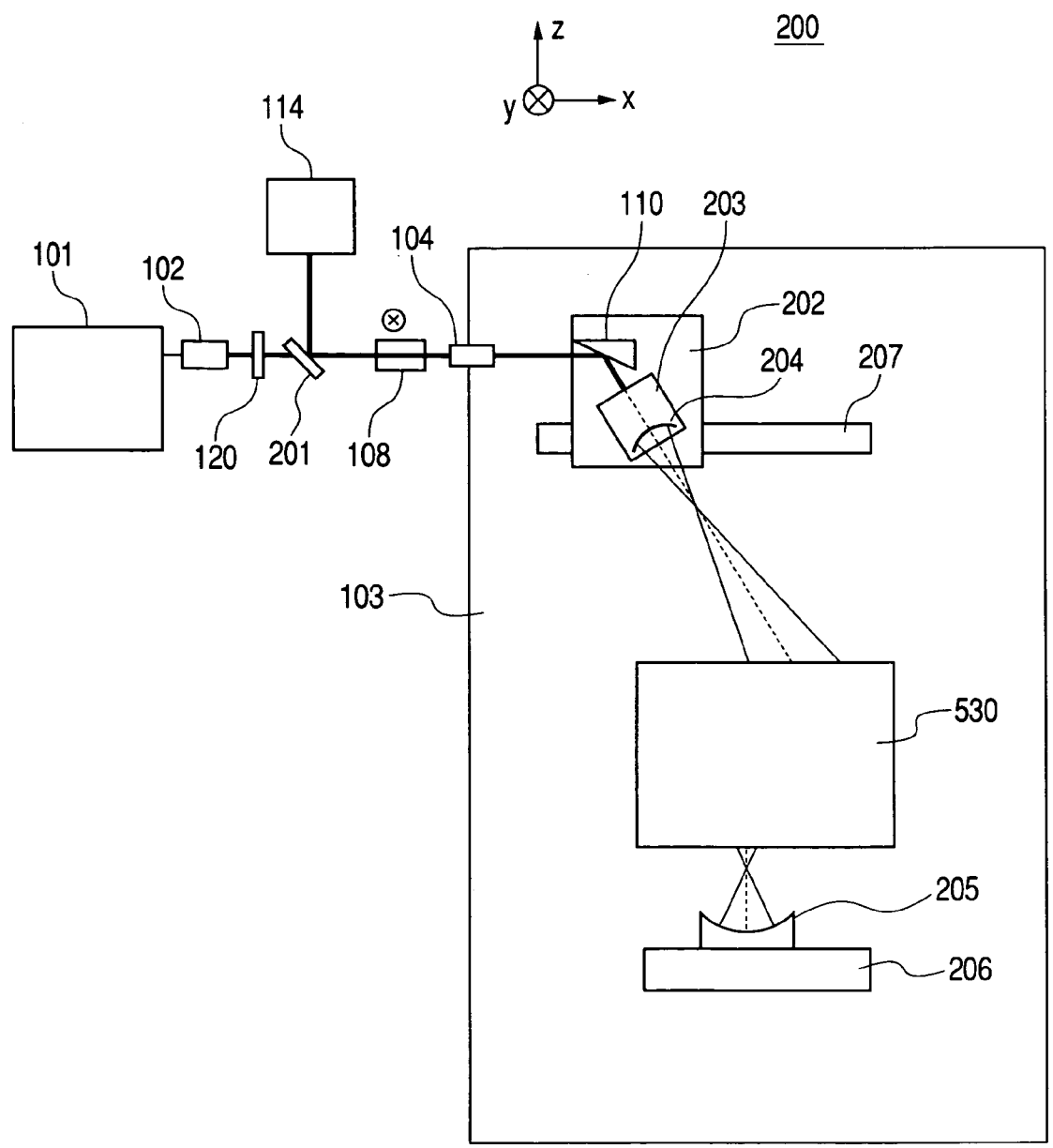
FIG. 11 schematically shows the construction of an illustrative form of an aberration measuring apparatus as an aspect of the present invention.

Another aberration measuring apparatus 200 of the present invention will hereinafter be described with reference to FIG. 11. FIG. 11 schematically shows the construction of an illustrative form of the aberration measuring apparatus 200 as an aspect of the present invention. The aberration measuring apparatus 200, unlike the aberration measuring apparatus 100, has a half-mirror 201, a Fizeau unit 202, a Fizeau lens 203, a spherical mirror 205, a spherical mirror driving stage 206 and a Fizeau unit driving stage 207, as shown in FIG. 11, and measures the wavefront aberration of the projection optical system 530.

The light emitted from the light source 101 has its diameter expanded by the expander 102, and becomes linearly polarized light parallel to the y-axis by the polarizing plate 120 and is transmitted through the half-mirror 201. The light source 101 is the same as the light source of the aberration measuring apparatus 100 shown in FIG. 1, and supplies light of a wavelength 150 nm to 300 nm, and specifically the fourth higher harmonic (a wavelength 266 nm) of light oscillated from glass such as YAG or YV04 having its Nd doped.

Making the polarization direction parallel to the y-axis is for making light efficiency good because the projection optical system 530 is a reflecting optical system and therefore light having polarization parallel to the x-axis is greatly attenuated and it is light having polarization parallel to the y-axis that arrives at the wafer surface.

The light-transmitted through the half-mirror 201 is moved in y-direction by the ray moving means 108, and thereafter enters the window 104.

The light having entered the Fizeau unit 202 is deflected by the bending mirror 110. The light deflected by the bending mirror 110 is condensed on the object point of the projection optical system 530 by the Fizeau lens 203.

The last surface of the Fizeau unit 202 is a so-called Fizeau surface 204 in which the light condensing position and the curvature center position of the Fizeau lens 203 coincide with each other, and part of the light is regularly reflected by the Fizeau surface 204 and is returned to the window 104.

The light having passed through the Fizeau lens 203 is imaged on the wafer side by the projection optical system 530. The imaged light is regularly reflected by the spherical mirror 205 having its curvature center at an imaging position on the wafer side, and thereafter again passes through the projection optical system 530 and passes through the Fizeau lens 203 and returns to the window 104.

The light having twice passed through the projection optical system 530 and the light reflected by the Fizeau surface 204 interfere with each other and also pass through the window 104 and the ray moving means 108, and is reflected by the half-mirror 201 and arrives at the image pickup means.

In such a state, the spherical mirror 205 is driven in z-direction by the spherical mirror driving stage 206 or scanning means, not shown, whereby the measurement of the wavefront aberration of the projection optical system 530 can be effected highly accurately by the so-called fringe scan method. The spherical mirror driving stage 206 may be a stage exclusively for the spherical mirror 205, or may be common to the wafer stage.

When the wavefront aberrations of the projection optical system 530 at the different image points thereof are to be measured, the Fizeau unit 202 is moved by the Fizeau unit driving stage 207 so that the light condensing point may become an object point to be measured. The Fizeau unit driving stage 207 may be a stage exclusively for the Fizeau unit 202, or may be common to the reticle stage. The spherical mirror 205 is also moved by the spherical mirror driving stage 206, and is moved to an image point to be measured. When the Fizeau unit 202 is moved in the direction of the y-axis, the ray is moved in the direction of the y-axis by the ray moving means 108 to thereby direct the light to the Fizeau unit 202.

In such a state, as described above, the spherical mirror 205 is scanned in the direction of the z-axis and phase measurement is effected by the fringe scan method, whereby the measurement of the wavefront aberrations of the projection optical system 530 at the different object points thereof becomes possible.

The reflectance of the Fizeau surface 204 is determined from the wavelength of the light source 101 and the reflectance of the multi-layer film mirror, not shown, of the projection optical system 530. That is, the reflectance of the Fizeau surface 204 is determined so that the amount of light after reflected by the Fizeau surface 204 and the amount of light transmitted through the Fizeau lens 204, passed through the projection optical system 530, reflected by the spherical mirror 205, again transmitted through the projection optical system 530 and returned to the Fizeau lens 203 may substantially equal to each other.

The reflectance RF of the Fizeau surface 204 is determined by mathematical expression 3 shown below when the reflectance of the multi-layer film mirrors, not shown, of the projection optical system 530 is defined as R and the number of the multi-layer film mirrors of the projection optical system 530 is defined as m.

$$RF = (1-RF) \times R^{(2 \times m)}$$

When for example, the number m of the multi-layer film mirrors constituting the projection optical system 530 is six and the reflectance R for a wavelength 266 nm exhibits about 70%, the reflectance of the Fizeau surface 204 is represented by the following mathematical expression 4.

$$RF = 1.4\%$$

where, it is the case that the reflectance of the spherical mirror 205 is 100%.

According to the aberration measuring apparatus 200 of the present invention, use is made of the light source 101 emitting light having a wavelength of a high reflectance to the multi-layer film mirrors, not shown, constituting the projection optical system 530, whereby the measurement of the wavefront aberration of the projection optical system 530 for a soft X-ray using a Fizeau interferometer technically high in degree of perfection becomes possible.

While in the present embodiment, the spherical mirror 205 is scanned in the direction of the z-axis as a phase modulating method, it is also possible to use the light source 101 as a variable wavelength laser, and phase-modulate by wavelength modulation. For such a light source 101, the fourth higher harmonic 248 to 266 nm of Ti-sapphire is desirable.

Also, when the wavefront aberration of the projection optical system 530 is to be measured by the use of the Twyman Green interference method or the shearing interference method, light of a wavelength of 260 nm to 280 nm, particularly the fourth higher harmonic from glass having its Nd doped, is used as the light source 101, whereby highly accurate measurement becomes possible.

Figure 12:
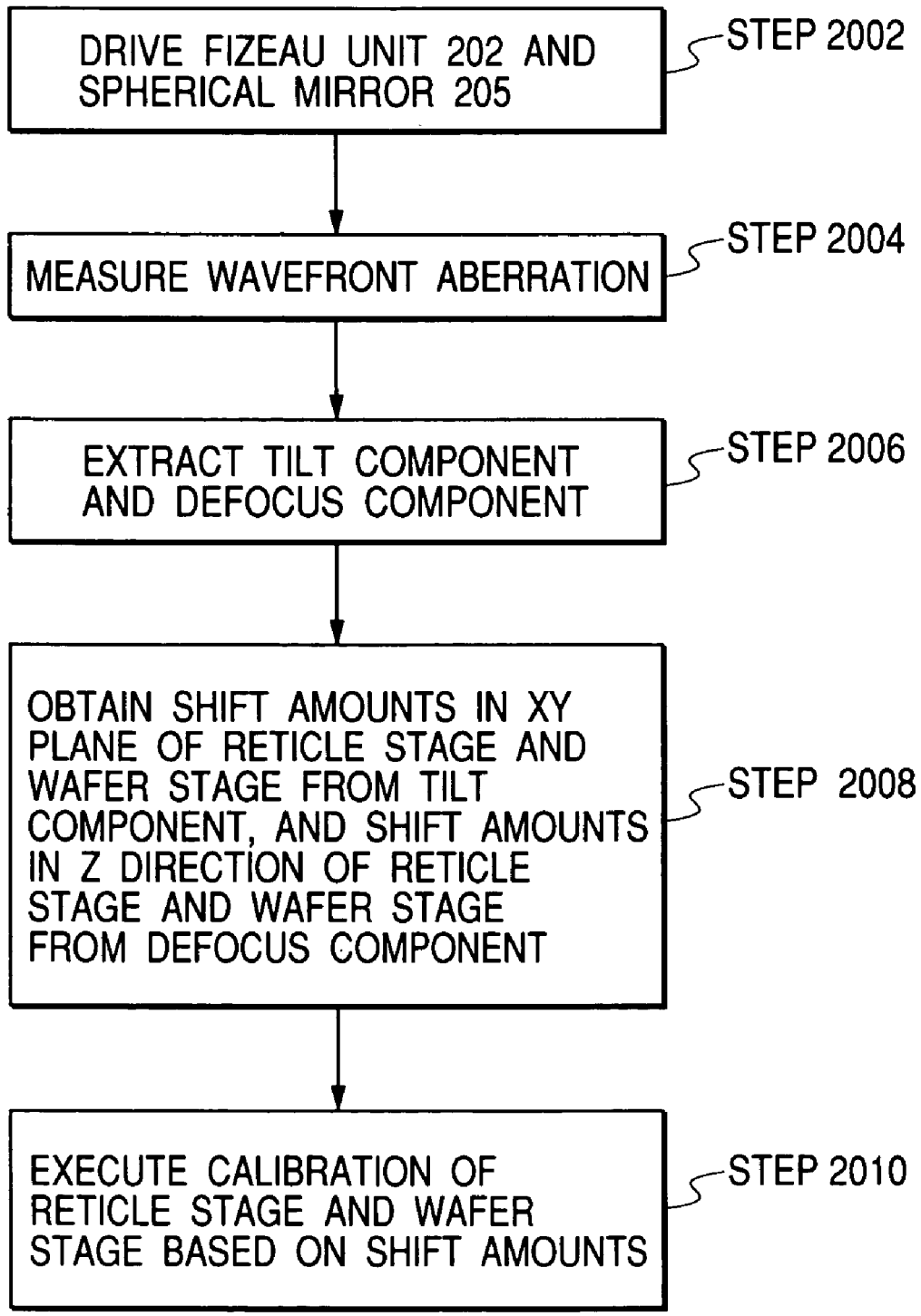
FIG. 12 is a flow chart for illustrating the calibration of a reticle stage and a wafer stage using the aberration measuring apparatus shown in FIG. 11.

The aberration measuring apparatus 200 can also effect the calibration of the reticle stage and the wafer stage. FIG. 12 is a flow chart for illustrating the calibration of the reticle stage and the wafer stage using the aberration measuring apparatus 200.

First, the Fizeau unit 202 and the spherical mirror 205 are moved to an object point and an image point to be measured, respectively, by the Fizeau unit driving stage 207 and the spherical mirror driving stage 206, respectively (a step 2002). Then, the measurement of the wavefront aberration is effected at positions to which the Fizeau unit 202 and the spherical mirror 205 have been moved (a step 2004). A tilt component and a defocus component are extracted from the measured wavefront aberration (a step 2006). The shift amounts in xy plane of the Fizeau unit 202 and the spherical mirror 205 are obtained from the tilt component extracted at the step 2006, and the shift amounts in the direction of the z-axis of the Fizeau unit 202 and the spherical mirror 205 are obtained from the defocus component (a step 2008), and the calibration of the reticle stage and the wafer stage is effected on the basis of such shift amounts.

If required, it is also possible to effect the calibration of the reticle stage and the wafer stage on the basis of the result of the measurement of a plurality of image points.

In the present embodiment, the calibration is effected on the basis of the wavefront aberration and therefore, it is not necessary to discretely prepare an alignment system, and it is possible to downsize the apparatus.

Figure 14:
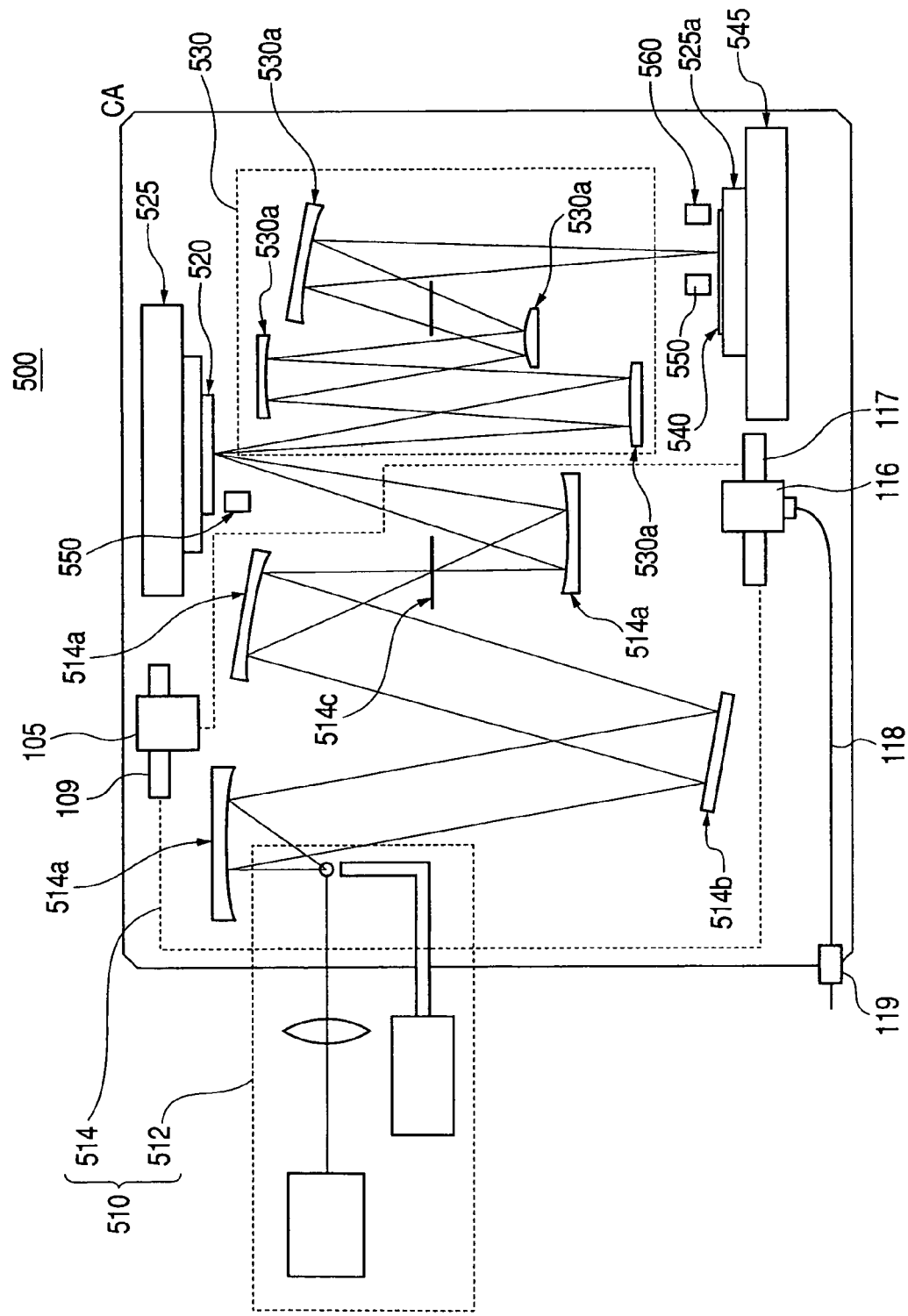
FIG. 14 schematically shows the construction of an illustrative exposing apparatus according to the present invention.

Reference is now had to FIG. 14 to describe an illustrative exposing apparatus 500 which can measure wavefront aberration of the projection optical system by the utilization of the aberration measuring apparatus 100 or 200 of the present invention. FIG. 14 schematically shows the construction of the illustrative exposing apparatus 500 of the present invention.

The exposing apparatus 500 of the present invention is a projection exposing apparatus using EUV light (e.g. a wavelength 13.4 nm) as illuminating light for exposure to expose a member 540 to be processed to a circuit pattern formed on a reticle 520, for example, by a step and scan method or a step and repeat method. Such an exposing apparatus is suitable for a lithography process of submicron or quarter micron or less, and in the present embodiment, description will hereinafter be made of an exposing apparatus of the step and scan type (called also the "scanner") as an example. The "step and scan method" is an exposing method of continuously scanning a wafer relative to a mask to thereby expose the wafer to a mask pattern, and also step-moving the wafer after the termination of one shot of exposure to thereby move the wafer to the next exposing area. The "step and repeat method" is an exposing method of step-moving a wafer at each collective exposure of the wafer to thereby move the wafer to the exposing area for the next shot.

Referring to FIG. 14, the exposing apparatus 500 has an illuminating apparatus 510, a reticle 520, a reticle stage 525 for placing the reticle 520 thereon, a projection optical system 530, a member 540 to be treated, a wafer stage 545 for placing thereon the member 540 to be processed, an alignment detecting mechanism 550 and a focus position detecting mechanism 560. The exposure apparatus 500 further comprises aberration measuring apparatus 100, as shown in FIG. 1. The aberration measuring apparatus 100 includes PDI unit driving stage 109, PDI unit 105, wafer side unit 116, and wafer side unit driving stage 117, in FIG. 14. A light source of the aberration measuring apparatus 100 is not shown in FIG. 14. Obviously, it is possible to use the aberration measuring unit 200 instead of the aberration measuring unit 100.

In case of measuring an aberration of the projection optical system, PDI unit 109 and the reticle stage 525 are driven to locate PDI unit 105 at a position of the reticle 520. Similarly, the water side unit driving stage 117 is driven to locate the wafer side unit 116 at a position of the member 540.

Also, as shown in FIG. 14, at least the interior of an optical path (i.e., the entire optical system) through which EUV light passes is a vacuum atmosphere VC because the EUV light is low in transmittance for the atmosphere and produces contamination by the reaction thereof with residual gases (such as oxygen, carbon dioxide and water vapor).

The illuminating apparatus 510 is an illuminating apparatus for illuminating the reticle 520 by arcuate EUV light (e.g. a wavelength 13.4 nm) for the arcuate field of view of the projection optical system 530, and has an EUV light source 512 and an illuminating optical system 514.

As the EUV light source 512, use is made, for example, of a laser plasma light source. This applies a pulse laser beam of high intensity to a target material in a vacuum container to thereby generate plasma of a high temperature, and utilizes EUV light of a wavelength of the order of e.g. 13 nm emitted therefrom. As the target material, use is made of metal film, gas jet, liquid drop or the like. To heighten the average intensity of the emitted EUV light, it is preferable that the repetition frequency of the pulse laser be high, and usually the pulse laser is operated at a repetition frequency of several kHz.

The illuminating optical system 514 is comprised of a light condensing mirror 514a and an optical integrator 514b. The light condensing mirror 514a plays the role of condensing the EUV light emitted substantially isotropically from the laser plasma. The optical integrator 514b has the role of illuminating the reticle 520 uniformly at a predetermined numerical aperture. Also, the illuminating optical system 514 is provided with an aperture 514c for restricting the illuminated area of the reticle 520 to an arcuate shape at a location conjugate with the reticle 520.

The reticle 520 is a reflection type mask having formed thereon a circuit pattern (or an image) to be transferred, and is supported and driven by a mask stage. Diffracted light emitted from the reticle 520 is reflected by the projection optical system 530 and is projected onto the member 540 to be processed. The reticle 520 and the member 540 to be processed are disposed in optically conjugate relationship with each other. The exposing apparatus 500 is an exposing apparatus of the step and scan type and therefore, scans the reticle 520 and the member 540 to be processed to thereby reduction-project the pattern of the reticle 520 onto the member 540 to be treated.

The reticle stage 525 supports the reticle 520 and is connected to a moving mechanism, not shown. Any structure well known to those skilled in the art can be applied to the reticle stage 525. The moving mechanism, not shown, is comprised of a linear motor or the like, and can drive the reticle stage 525 at least in x-direction to thereby move the reticle 520. The exposing apparatus 500 scans the reticle 520 and the member 540 to be processed in their synchronized state. Here, in the surface of the reticle 520 or the member 540 to be processed, the scanning direction is defined as X, a direction perpendicular thereto is defined as Y, and a direction perpendicular to the interior of the plane of the reticle 520 or the member 540 to be processed is defined as Z.

The projection optical system 530 reduction-projects the pattern on the surface of the reticle 520 onto the member 540 to be processed which is an image plane, by the use of a plurality of reflecting mirrors (i.e., multi-layer film mirrors) 530a. The number of the plurality of mirrors 530a is of the order of four to six. To realize a wide exposing area by a small number of mirrors, only a thin arcuate area (ring field) spaced apart by a predetermined distance from an optical axis is used to scan the reticle 520 and the member 540 to be processed at a time and transfer a wide area. The numerical aperture (NA) of the projection optical system 530 is of the order of 0.1 to 0.2. The aberration measuring apparatuses 100 and 200 of the present invention can be applied to the measurement of the wavefront aberration of such a projection optical system 530, and the wavefront aberration is measured by the aberration measuring apparatuses 100 and 200, and use is made of the projection optical system 530 in which such a measurement value is within an allowable range, whereby excellent imaging performance can be displayed.

In the present embodiment, the member 540 to be processed is a wafer, but widely includes a liquid crystal substrate and other members to be processed. Photoresist is applied to the member 540 to be processed. The photoresist applying step includes pre-treatment, a close contact improving agent applying process, a photoresist applying process and a pre-baking process. The pre-processing includes washing, drying, etc. The close contact improving agent applying process is a surface property improving (i.e., making hydrophobic by the application of an interfacial active agent) process for enhancing the close contact property between photoresist and groundwork, and coats or vapor-processes organic film such as hexamethyl-disilazane (HMDS). Pre-baking is a baking (sintering) step, but is softer than that after developing, and removes a solvent.

The wafer stage 545 supports the member 545 to be processed by a wafer chuck 525a. The wafer stage 545 utilizes, for example, a linear motor to move the member 540 to be processed in X, Y and Z directions. The reticle 520 and the member 540 to be processed are scanned in synchronism with each other. Also, the position of the reticle stage 525 and the position of the wafer stage 545 are monitored, for example, by a laser interferometer or the like, and the two are driven at a constant speed ratio.

The alignment detecting mechanism 550 measures the positional relation between the position of the reticle 520 and the optical axis of the projection optical system 530, and the positional relation between the position of the member 540 to be processed and the optical axis of the projection optical system 530, and sets the positions and angles of the reticle stage 525 and the wafer stage 545 so that the projected image of the reticle 520 may coincide with the predetermined position of the member 540 to be processed.

The focus position detecting mechanism 560 measures the focus position in Z direction by the surface of the member 540 to be treated, and controls the position and angle of the wafer stage 545 to thereby always keep the surface of the member 540 to be treated at the imaging position by the projection optical system 530 during exposure.

In the present embodiment, provision is made of the alignment detecting mechanism 550 and the focus position detecting mechanism 560, but as described above, by the aberration measuring apparatuses 100 and 200 of the present invention, it becomes unnecessary to provide the alignment detecting mechanism 550 and the focus position detecting mechanism 560.

In exposure, the EUV light emitted from the illuminating apparatus 510 illuminates the reticle 520, and causes the pattern on the surface of the reticle 520 to be imaged on the surface of the member 540 to be processed. In the present embodiment, the image plane becomes an arcuate (ring-shaped) image plane, and the reticle 520 and the member 540 to be processed are scanned at the speed ratio of a reduction magnification ratio to thereby expose the entire surface of the reticle 520 to the light.

Figure 15:
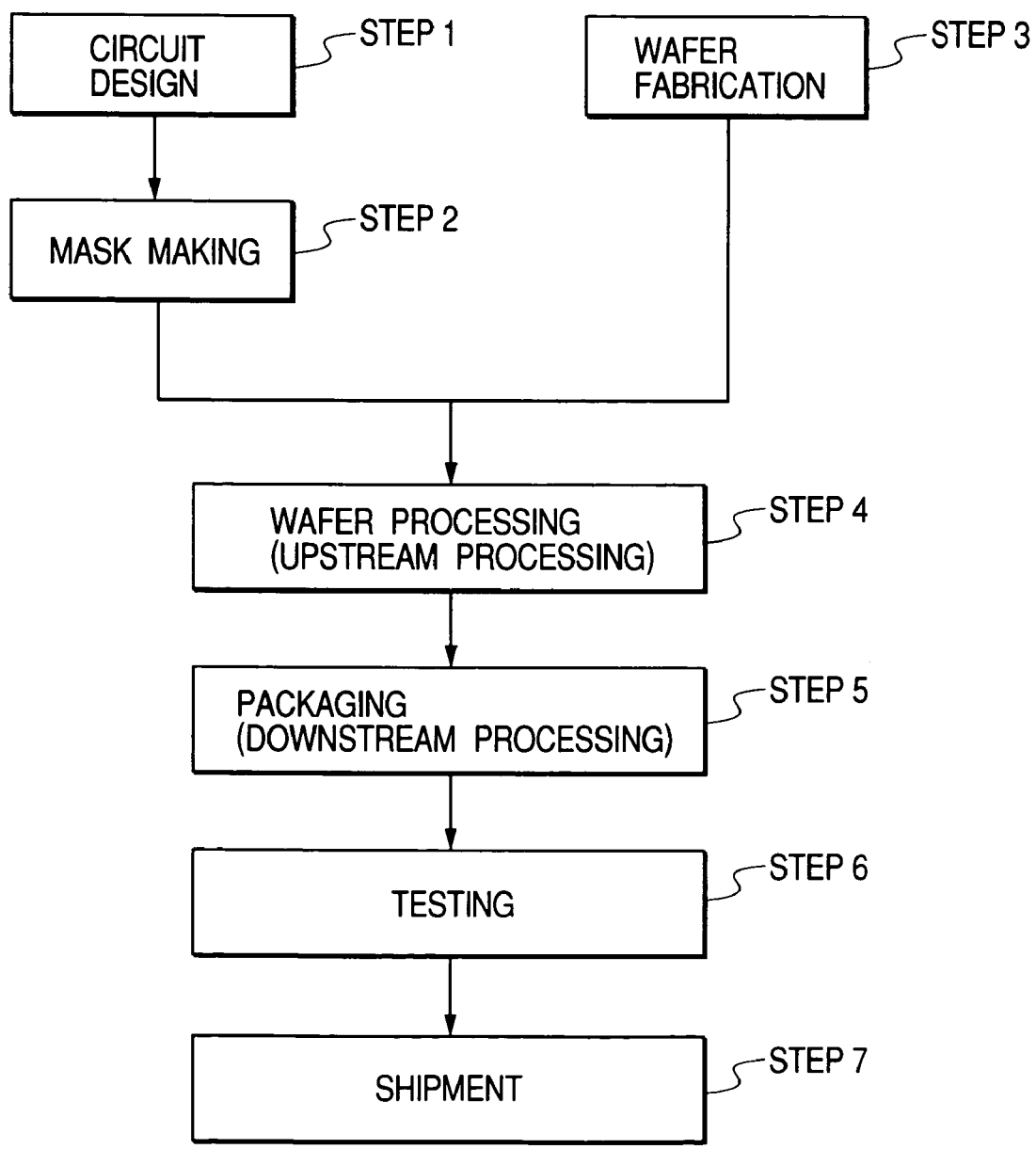
FIG. 15 is a flow chart for illustrating the manufacture of a device (a semiconductor-chip such as an IC or an LSI, an LCD, a CCD or the like).
Figure 16:
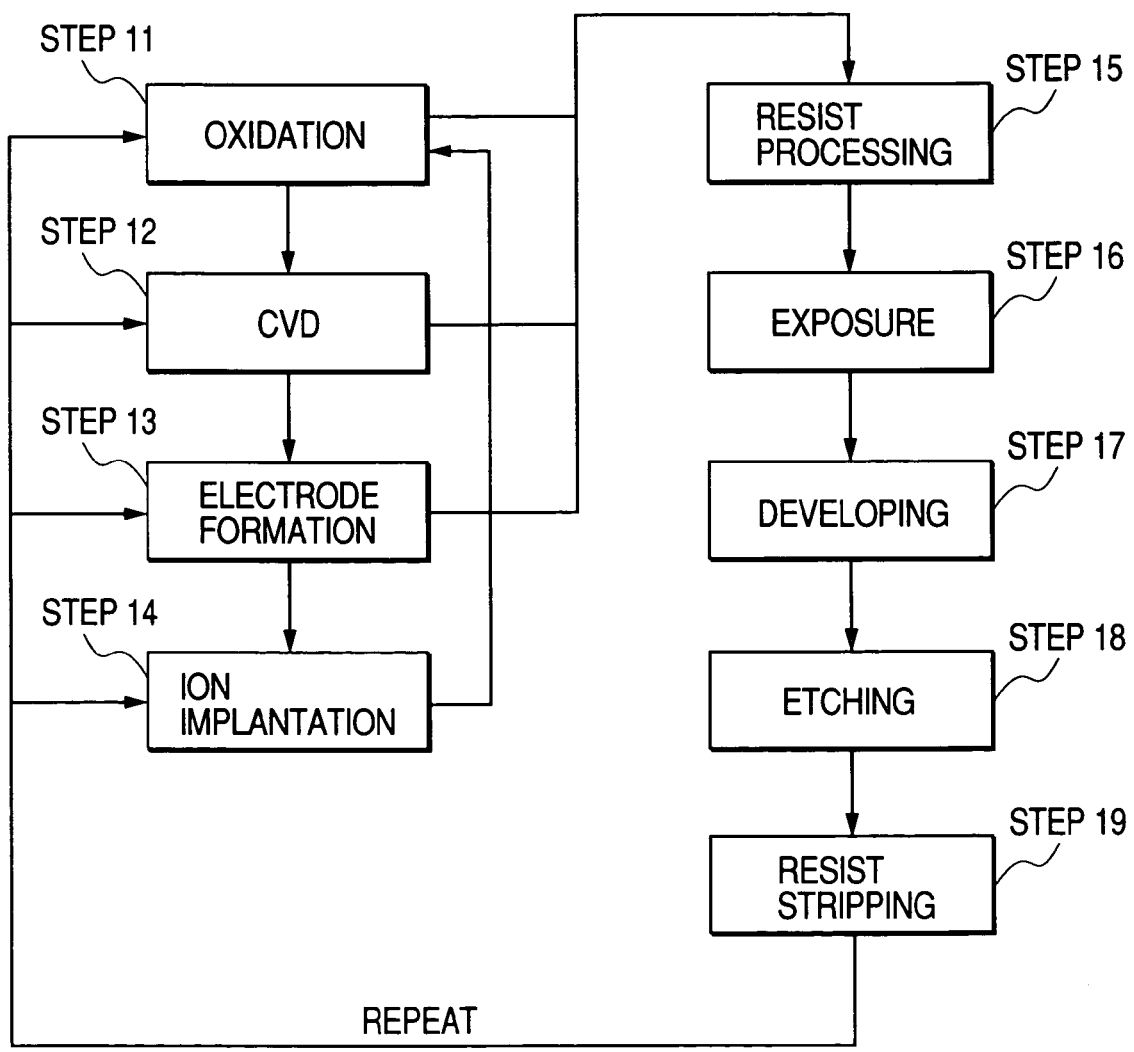
FIG. 16 is a detailed flow chart of a step 4 shown in FIG. 15.

Reference is now had to FIGS. 15 and 16 to describe an embodiment of a device manufacturing method utilizing the above-described exposing apparatus 500. FIG. 15 is a flow chart for illustrating the fabrication of devices (semiconductor chips such as IC and LSI, an LCD, a CCD, etc.). In the present embodiment, the fabrication of a semiconductor chip will be described as an example. At a step 1 (circuit design), the circuit design of a device is effected. At a step 2 (mask making), a mask on which a designed circuit pattern has been formed is made. At a step 3 (wafer fabrication), a wafer is fabricated by the use of a material such as silicon. A step 4 (wafer processing) is called upstream processing, and by the use of a mask and the wafer, an actual circuit is formed on the wafer by the lithography technique. A step 5 (packaging) is called downstream processing, and is the step of making a semiconductor chip by the use of the wafer prepared by the step 4, and includes steps such as an assembling step (dicing and bonding) and a packaging step (chip enclosing). At a step 6 (testing), tests such as the operation confirming test and durability test of the semiconductor device prepared at the step 5 are performed. A semiconductor device is completed via such steps, and it is shipped (a step 7).

FIG. 16 is a detailed flow chart of the wafer processing of the step 4. At a step 11 (oxidation), the surface of the wafer is oxidized. At a step 12 (CVD), insulating film is formed on the surface of the wafer. At a step 14 (ion implantation), ions are implanted into the wafer. At a step 15 (resist processing), a photosensitive agent is applied to the wafer. At a step 16 (exposure), the wafer is exposed to the circuit pattern of the mask by the exposing apparatus 500. At a step 17 (developing), the exposed wafer is developed. At a step 18 (etching), the other portion than the developed resist image is shaved off. At a step 19 (resist stripping), the resist which has become unnecessary after the etching has ended is removed. By these steps being repetitively executed, a circuit pattern is multiplexly formed on the wafer. According to the device manufacturing method of the present embodiment, a device higher in quality than before can be manufactured. Thus, the device manufacturing method using the exposing apparatus 500, and the device as the result thereof also constitute an aspect of the present invention.

While the preferred embodiments of the present invention have been described above, of course, the present invention is not restricted to these embodiments, but various modifications and changes are possible within the scope of the gist of the invention.

What is claimed is:

1. A measuring apparatus for measuring the wavefront aberration of an optical system for a soft X-ray, comprising:
   a light source for supplying light of a predetermined wavelength within a wavelength range of 150 nm to 300 nm;
   a diffraction grating for diffracting the light from said light source;
   a first mask formed with a first opening of a size equal to or larger than the diffraction limit of said optical system, and a second opening of a size smaller than the diffraction limit of said optical system, said first opening being formed at a location at which a first diffracted light diffracted by said diffraction grating enters, said second opening being formed at a location whereat a second diffracted light differing in order from said first diffracted light enters;
   a second mask formed with a third opening of a size equal to or larger than the diffraction limit of said optical system, and a fourth opening of a size smaller than the diffraction limit of said optical system, said third opening being formed at a location whereat said second diffracted light passed through said optical system enters, said fourth opening being formed at a location whereat said first diffracted light passed through said optical system enters; and
   a detector disposed at a neighborhood of the conjugate plane of the pupil of said optical system; and
   wherein the wavefront aberration of said optical system is obtained on the basis of an interference fringe detected by said detector.

2. A measuring apparatus according to claim 1, wherein said predetermined wavelength is a wavelength within a wavelength range of 260 nm to 280 nm.

3. An exposing apparatus comprising:
a first stage for placing thereon a reticle having a pattern formed thereon;
a second stage for placing thereon a member to be processed; and
a projection optical system for projecting the pattern formed on said reticle onto said member to be processed, said projection optical system having the wavefront aberration thereof measured by the use of the measuring apparatus of claim 1.

4. A device manufacturing method comprising:
a step of applying a photosensitive agent to a member to be processed;
an exposing step of exposing said member to be processed by the exposing apparatus of claim 3; and
a developing step of developing said exposed member to be processed.

* * * * *